United States Patent [19]

Knuefelmann et al.

[11] 4,379,239
[45] Apr. 5, 1983

[54] CIRCUIT FOR GENERATING A TRIGGER PULSE

[75] Inventors: Manfred Knuefelmann, Duesseldorf; Burkhard Brandner; Reinhold Blauhut, both of Werdohl, all of Fed. Rep. of Germany

[73] Assignee: Firma Atlas Fahrzeugtechnik GmbH, Fed. Rep. of Germany

[21] Appl. No.: 391,351

[22] Filed: Jun. 23, 1982

[30] Foreign Application Priority Data

Jul. 22, 1981 [DE] Fed. Rep. of Germany ....... 3128922

[51] Int. Cl.³ .......................... H03K 3/00; H03K 5/01; F02P 5/04
[52] U.S. Cl. .................................... 307/268; 123/609; 328/55
[58] Field of Search .............. 328/55, 63; 235/92 MP; 307/268, 269, 260; 123/428, 602, 609, 618, 619

[56] References Cited

U.S. PATENT DOCUMENTS

| | | | |
|---|---|---|---|
| 3,652,832 | 3/1972 | Baumann | 235/92 MP |
| 3,696,303 | 10/1972 | Hartig | 328/55 |
| 3,976,043 | 8/1976 | Canup et al. | 123/609 |
| 4,018,202 | 4/1977 | Gartner | 123/609 |
| 4,233,592 | 11/1980 | Leichle | 235/92 EV X |
| 4,298,941 | 11/1981 | Furuhashi | 123/609 X |

FOREIGN PATENT DOCUMENTS 23960 6/1980 European Pat. Off. .
1917389 5/1971 Fed. Rep. of Germany .
2010999 7/1974 Fed. Rep. of Germany .
2512166 10/1976 Fed. Rep. of Germany .

OTHER PUBLICATIONS

German Publication, Electronik, dated 1977, (pp. 64 to 68), by Gunther Klasche.

*Primary Examiner*—Donald A. Griffin
*Attorney, Agent, or Firm*—Bacon & Thomas

[57] ABSTRACT

Circuit for generating a trigger pulse delayed within a period of a periodical motion of variable periodic time, the phase lag relative to a zero phase being dependent on the periodic time and other parameters, a zero pulse and angle pulses starting at zero 5 phase being generated, the pulse frequency being inversely proportional to the periodic time, the angle pulses being fed into a counter and correcting data being generated within every period during a constant-time window. The technical problem the invention relates to is to design the circuit so that a single sequence of angle pulses may be evaluated and no control pulses are necessary except a reference pulse for defining a reference phase. According to the invention the following solution to the problem is proposed: during a constant-time window the angle pulses are varied under control so that each single pulse may be duplicated, counted normally, or suppressed. In this way correcting pulses according to individual characteristics may be generated during the time window.

4 Claims, 1 Drawing Figure

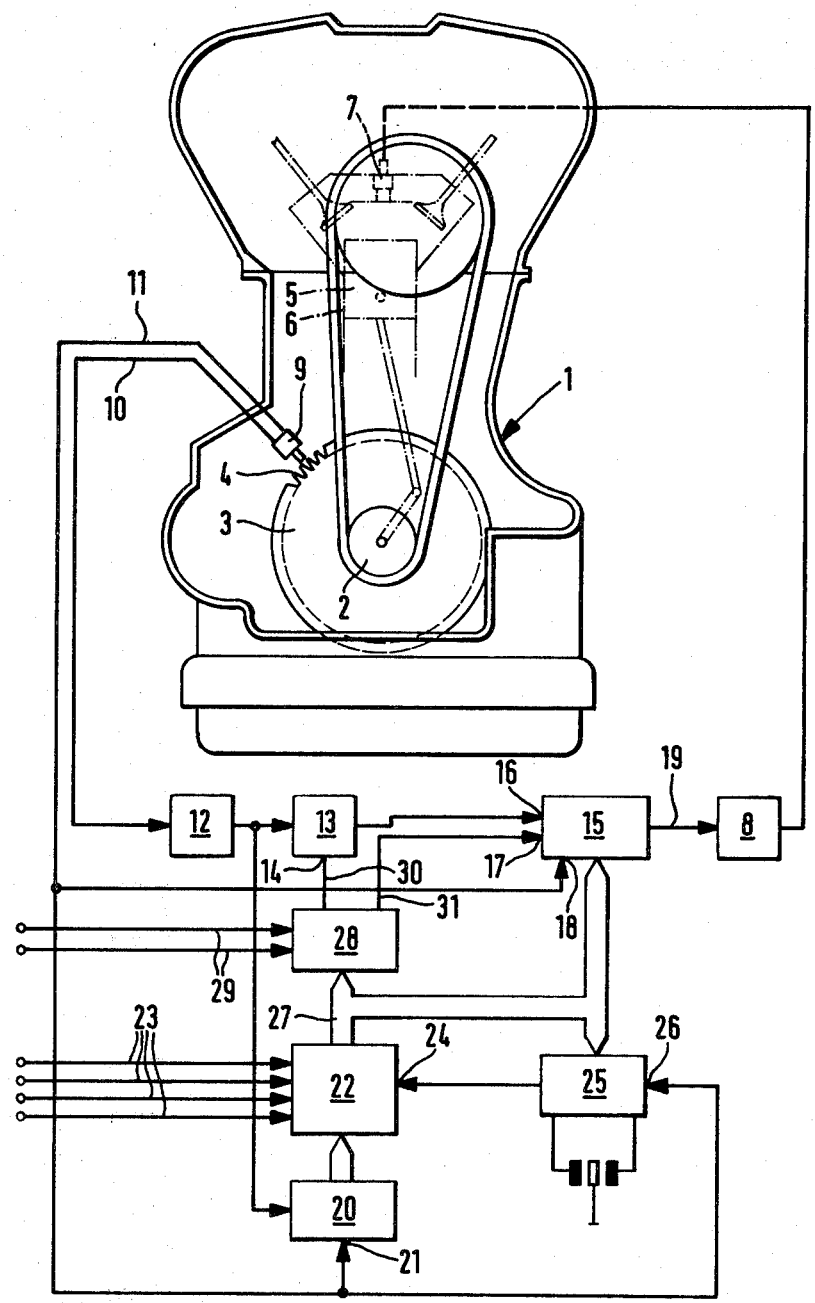

CIRCUIT FOR GENERATING A TRIGGER PULSE

BACKGROUND OF THE INVENTION

1. Field of the Invention

The invention relates to a circuit for generating a trigger pulse delayed within a period of a motion of variable periodic time, the phase lag relative to a zero phase being dependent on the periodic time and other parameters, a zero pulse and angle pulses starting at zero phase being generated, the pulse frequency being inversely proportional to the periodic time, the angle pulses being fed into a counter and correcting data being generated within every period during a constant-time window.

2. Description of the Prior Art

The patent application DE-PS 19 17 389 and the additional patent application DE-PS 20 10 999 show a circuit which requires a reference sequence, a separate trigger sequence, and auxiliary pulses during one period. Essentially, the reference sequence is counted during a constant-time window and gives a correction depending on the speed. Finally, the trigger sequence determines the phase relation between the trigger pulse and a reference phase. Further correction pulses are proposed for a correction depending on the load conditions. It is a disadvantage of this method that the reference sequence and the trigger sequence must be selected by separate auxiliary pulses. There is also a time difference between the reference sequence and the trigger sequence.

DE-AS 19 09 525 shows a circuit in which so-called set-pulses are fed into a counter during a period. Hereafter the trigger pulse is generated by means of counting pulses. It is a disadvantage of this method that the set pulses are generated by a pulse source independent of the motion; this may lead to faults hardly to be cleared.

SUMMARY OF THE INVENTION

It is the object of the invention to provide a circuit of the kind mentioned above designed so that a single angle pulse sequence may be evaluated and no control pulses are required except a reference pulse for defining a reference phase.

According to the invention this object is accomplished by the following elements:
(a) during every period the angle pulses effect the increment of a phase address counter the output of which provides a multi-bit address signal assigned to the respective angle pulse;
(b) the multi-bit address signal is fed into the input of a correction data memory the output of which provides a multi-bit correcting signal;
(c) the output of the correction data memory may be disabled by the output pulse of a time window circuit;
(d) the angle pulses are fed into a controlled duplicator the duplicating input of which is controlled by one bit of the multi-bit correcting signal;
(e) the output of the controlled duplicator is connected to a counter with a disable-input controlled by a second bit of the multi-bit correction signal.

According to the invention the continuous sequence of angle pulses is evaluated in the circuit. Beside this only a zero pulse is required to define a reference phase and to reset the circuit to the initial conditions. This zero pulse triggers a time window which allows the angle pulses to be varied during its on-state. With each phase increment the respective angle pulse is varied according to the correction data stored in a correction memory. These correction data are controlled by an address counter. Because the correction data memory is a matrix memory, it may be controlled by additional signals such as signals dependent on load or on other parameters so that the correction data allow a correction dependent not only on speed but also on load conditions and other operating conditions. The correction data determine whether an angle pulse is suppressed, or counted once, or counted twice. Therefore a correction independent of the other pulses can be assigned to each of the angle pulses. Each angle pulse causes the trigger pulse to be delayed by one increment of the system. With the circuit according to the invention the application of trigger characteristics of any form is made possible.

BRIEF DESCRIPTION OF THE DRAWING

An embodiment of the invention is illustrated in the following, referring to the drawing which shows a schematic of a combustion engine together with a block diagram of the circuit according to the invention.

DESCRIPTION OF THE PREFERRED EMBODIMENT

The drawing shows a schematic of a combustion engine 1. A crankshaft 2 is connected with a flywheel 3 with a toothed ring 4 which is required for starting the engine. Pistons 5 moving in cylinders 6 are connected with the crankshaft 2. At least one spark plug 7 connected to an ignition circuit 8 is arranged within each cylinder head.

An angle pulse generator 9 facing the toothed flywheel ring 4 transmits an angle pulse into a line 10 whenever a tooth of the toothed ring 4 passes. The frequency of these angle pulses is inversely proportional to the periodic time of the flywheel 3 and the crankshaft 2. On the other hand, a zero pulse corresponding to the zero phase of the crankshaft 2 is transmitted into the line 11 whenever a reference tooth of the toothed ring 4 passes. The zero tooth has been specially marked to generate this zero pulse.

The circuit for generating a trigger pulse includes a pulse duplicator 12 to duplicate the angle pulses so that the pulse edges can be evaluated. The pulse duplicator 12 is followed by a controlled duplicator 13 having a duplicating input 14. The controlled duplicator 13 does not duplicate the pulses unless the duplicator input 14 is "high". The output pulses of the controlled duplicator 13 are fed into the counting input 16 of a counter 15. The counter 15 includes a disable input 17 and a reset input 18 controlled by the zero pulse from the line 11.

When the counter 15 has counted up to a preselected number, preferably zero, it sends a pulse into the line 19. The line 19 is connected to the ignition circuit and causes an immediate ignition pulse for the spark plug 7. The drawing shows only one ignition circuit 8 for one spark plug 7. The ignition pulses for the spark plugs of the other cylinders can be derived from this first ignition pulse by means of well-known methods.

The output pulses of the pulse duplicator 12 are also fed into an address counter 20 having a reset input 21. Corresponding to its count the output of the address counter provides a multi-bit address signal which corresponds exactly to the phase of the rotation. The multi-bit address signal drives the address input of a correction data memory 22. The storage address locations of the correction data memory 22 content multi-bit correction data assigned to the addresses (details will follow). The correction data memory has another multi-bit input 23, which may be controlled by address signals depending on load conditions. Moreover there is a disable-input 24 driven from the output of a time window circuit 25. The time window circuit 25 has a trigger input 26 and after being triggered it produces an output signal of preselected duration to determine the time window mentioned before. The trigger input 26 is also connected to the line 11 where the zero pulse comes from.

The output of the correction data memory transmits multi-bit correction signals into a data bus 27. The correction signals may consists of 8 bit, for instance. In general, only a few bits are necessary, so it is possible to evaluate subgroups of the multi-bit correction signals. The subgroups may be assigned to various families of characteristics and driven from a multiplexer 28. The input of the multiplexer 28 is controlled by the lines 29 which carry temperature-dependent signals, for instance. The data bus 27 is also connected to the time window circuit 25 and to the counter 15. Suitable data bits allow the time window to be adjusted in accordance with the address; in addition, the reset of the counter 15 is also made possible in order to suppress the ignition pulse when the engine exceeds the speed limit.

The output of the multiplexer 28 sends a two-bit signal to the lines 30 and 31. The line 30 is connected to the duplicating input 14 of the controlled duplicator. If the line 30 is "low", then the pulse will not be duplicated by the controlled duplicator 13. If the line 30 is "high", then the pulse will be duplicated. Finally the signal of the line 31 is fed into the disable input 17 of the counter 15. When the disable input is "low", then the counter 15 works normally, and when the disable input 17 is "high", the counter will not count the pulses fed into its counting input 16.

The function of the circuit is described in the following: When the combustion engine 1 is operated, zero pulses and angle pulses according to the motion of the crankshaft are sent into the lines 11 resp. 10 during each revolution. The zero pulse generated during a revolution serves as a reference pulse and resets the counter 15 and the address counter 20 to the preselected initial conditions; furthermore it triggers the time window circuit 25 to send a rectangular pulse of preselected duration to the disable-input 24 of the correction data memory 22 in order to determine a time window in the course of which the output of the correction data memory 22 is active.

During the further rotation of the crankshaft 2 the angle pulses are sent into the line 10 and duplicated in the pulse duplicator 12. The duplicated angle pulses are fed into the address counter 20 the output of which provides a multi-bit address signal indicating the actual phase relation of the crankshaft 2. This multi-bit address signal calls the respective storage location of the correction data memory 22. This correction data memory 22 contains two-bit correction signals. Correction signals according to speed-dependent ignition characteristics may be stored in the correction data memory. In addition, it is possible to evaluate load-dependent correction signals by feeding informations about the load conditions of the engine into the multi-bit input 23. These correction signals are available through the data bus 27. Because each memory location contains an eight-bit signal, it is possible to arrange four two-bit correction signals in one eight-bit word.

The multiplexer 28 serves to select two-bit correction signals from the eight-bit correction signal on the basis of a temperature-dependent select signal; these two-bit correction signals are fed into the lines 30 and 31. These correction signals characterize three correction conditions: First, both signals may be "low". Then the pulse is not duplicated in the controlled duplicator 13, but the signal across the counting input 16 is counted normally. This means that the angle pulse is immediately fed into the counter 15. Secondly, the line 30 may carry a "high" signal and the line 31 may carry a "low" signal. This means that the pulses are duplicated in the controlled duplicator 13 and that the counter 15 counts the signals across its counting input 16. Therefore an additional pulse is generated and counted. Finally, the line 31 may be "high" and the line 30 may arbitrarily be "low" or "high". In this case the counter 15 does not count the respective angle pulse.

As soon as the time window pulse across the disable-input 24 has finished, the voltages across the lines 30 and 31 are set "low" resp. "high" so that at the end of the time window the angle pulses duplicated in the duplicator are normally counted until the preselected count of the counter 15 has been reached and a trigger pulse is sent into the line 19 for activating the ignition circuit 8.

We claim the following:

1. Circuit for generating a trigger pulse delayed within a period of a motion of variable periodic time, the phase lag relative to a zero phase being dependent on the periodic time and other parameters, a zero pulse and angle pulses starting at zero phase being generated, the pulse frequency being inversely proportional to the periodic time, the angle pulses being fed into a counter and correcting data being generated within every period during a constant-time window, characterized by the following elements:
   (a) During every period the angle pulses are counted by a phase address counter (20) the output of which provides a multi-bit address signal assigned to the respective angle pulse;
   (b) the multi-bit address signal is fed into the input of a correction data memory (22) the output of which provides a multi-bit correction signal;
   (c) the output of the correction data memory (22) can be disabled by the output pulse of a time window circuit (25)
   (d) the angle pulses are fed into a controlled pulse duplicator (13) the duplicating input (14) of which is controlled by one bit of the multi-bit correction signal;
   (e) the output of the controlled duplicator (13) is connected to a counter (15) with a disable input (17) controlled by a second bit of the multi-bit correction signal.

2. Circuit according to claim 1, characterized in that a pulse duplicator (12) is arranged to drive the controlled duplicator (13) and that the output pulses of the pulse duplicator (12) drive the phase address counter (20).

3. Circuit according to claim 2, characterized in that the line (11) carrying the zero pulse is connected to the trigger input (26) of the time window circuit (25) and to the reset input (18) of the counter (15).

4. Circuit according to claims 1 or 2 or 3, characterized in that the output bus (27) of the correction data memory is connected to a multiplexer (28) the inputs lines (29) of which are controlled by additional control signals.

* * * * *